(12) United States Patent
Ballestad et al.

(10) Patent No.: US 9,466,098 B2
(45) Date of Patent: *Oct. 11, 2016

(54) LOCAL DEFINITION OF GLOBAL IMAGE TRANSFORMATIONS

(71) Applicant: Dolby Laboratories Licensing Corporation, San Francisco, CA (US)

(72) Inventors: Anders Ballestad, Vancouver (CA); Gerwin Damberg, Vancouver (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 14/554,783

(22) Filed: Nov. 26, 2014

(65) Prior Publication Data

US 2015/0084978 A1    Mar. 26, 2015

Related U.S. Application Data

(63) Continuation of application No. 13/442,766, filed on Apr. 9, 2012, now Pat. No. 8,907,971.

(60) Provisional application No. 61/473,689, filed on Apr. 8, 2011.

(51) Int. Cl.
*G06T 5/40* (2006.01)
*G06T 5/00* (2006.01)
*G06K 9/00* (2006.01)

(52) U.S. Cl.
CPC ........... *G06T 5/009* (2013.01); *G06K 9/00234* (2013.01); *G06T 5/40* (2013.01); *G06T 2207/10024* (2013.01); *G06T 2207/20012* (2013.01); *G06T 2207/30201* (2013.01)

(58) Field of Classification Search
CPC combination set(s) only.
See application file for complete search history.

(56) References Cited

U.S. PATENT DOCUMENTS

| | | |
|---|---|---|
| 5,325,449 A | 6/1994 | Burt |
| 5,633,511 A | 5/1997 | Lee |
| 5,930,397 A | 7/1999 | Tsujii |
| 6,469,710 B1 | 10/2002 | Shum |
| 6,538,659 B2 | 3/2003 | Fujimura |
| 6,608,926 B1 | 8/2003 | Suwa |
| 7,133,571 B2 | 11/2006 | Cheatle |
| 7,623,683 B2 | 11/2009 | Chen |

(Continued)

FOREIGN PATENT DOCUMENTS

| | | |
|---|---|---|
| EP | 1465436 A1 | 10/2004 |
| EP | 2034439 A1 | 3/2009 |
| WO | 2010132237 A1 | 11/2010 |

OTHER PUBLICATIONS

Ho, C.-C. et al., "A User-Attention Based Focus Detection Framework and Its Applications", IEEE, Dec. 15-18, 2003, pp. 1315-1319.

(Continued)

*Primary Examiner* — Wesner Sajous

(57) ABSTRACT

A global image adjustment, such as dynamic range adjustment is established based on image characteristics. The image adjustment is based more heavily on pixel values in image areas identified as being important by one or more saliency mapping algorithms. In one application to dynamic range adjustment, a saliency map is applied to create a weighed histogram and a transformation is determined from the weighted histogram. Artifacts typical of local adjustment schemes may be avoided.

24 Claims, 3 Drawing Sheets

(56) References Cited

U.S. PATENT DOCUMENTS

| | | | |
|---|---|---|---|
| 7,636,098 B2 | 12/2009 | Yang et al. | |
| 7,639,893 B2 | 12/2009 | Duan | |
| 8,218,895 B1* | 7/2012 | Gleicher | G06T 3/0025 345/427 |
| 8,363,939 B1* | 1/2013 | Khosla | G06K 9/3241 382/164 |
| 8,907,971 B2* | 12/2014 | Ballestad | G06K 9/00234 345/589 |
| 2002/0191861 A1 | 12/2002 | Cheatle | |
| 2008/0101761 A1 | 5/2008 | Widdowson | |
| 2008/0298704 A1 | 12/2008 | Nachlieli et al. | |
| 2008/0304740 A1 | 12/2008 | Sun | |
| 2009/0175595 A1 | 7/2009 | Le Meur | |
| 2009/0190857 A1* | 7/2009 | Epshtein | G06T 17/05 382/276 |
| 2010/0124371 A1 | 5/2010 | Jiang et al. | |
| 2010/0189354 A1* | 7/2010 | de Campos | G06K 9/00597 382/190 |
| 2010/0195901 A1* | 8/2010 | Andrus | H04N 5/213 382/162 |
| 2012/0093402 A1* | 4/2012 | Staelin | G06K 9/4671 382/165 |
| 2012/0106850 A1 | 5/2012 | Koch et al. | |
| 2012/0218442 A1* | 8/2012 | Jandhyala | G06T 7/20 348/239 |
| 2012/0307155 A1* | 12/2012 | Gleicher | G06T 3/0093 348/581 |

OTHER PUBLICATIONS

Petit, J. et al., "Saliency Maps of High Dynamic Range Images", Proceedings of the 6th Symposium on Applied Perception in Graphics and Visualization, 2009, p. 134, published by ACM.

Lee, C.H., "Perceptual Graphics for Effective Visualization", 2005.

Lee, C.H., "Saliency-Guided Lighting", IEICE Trans. Inf. & Syst. vol. E92-D, No. 2, Feb. 2009, vol. 29, No. 2, pp. 369-373, published by Oxford University Press.

Lee, C.H. et al., "Mesh Saliency", ACM Transactions on Graphics, 2005, vol. 24, issue 3, published by ACM, pp. 659-666.

Obrador, P., "Content Selection Based on Compositional Image Quality", published in and presented at the IS&T/SPIE 19th Annual Symposium on Electronic Imaging, Jan. 28-Feb. 1, 2007, San Jose, CA, USA.

Yubing, T., et al., "Full Reference Image Quality Assessment Based on Saliency Map Analysis", J. Imaging Sci, Technol., vol. 54, Apr. 27, 2010.

Yoon, S.-E. et al., "Quick-VDR: Interactive View-Dependent Rendering of Massive Models", IEEE, Oct. 2004.

Durand, F. et al., "Fast Bilateral Filtering for the Display of High-Dynamic Range Images", SIGGRAPH 2002.

Duan, J. et al., "Tone-Mapping High Dynamic Range Images by Novel Histogram Adjustment", Pattern Recognition, vol. 43, No. 5, May 2010, pp. 1847-1862.

Khan, I.R. et al., "HDR Image Tone Mapping Using Histogram Adjustment Adapted to Human Visual System", ICICS 2009 Proceedings of the 7th International Conference on Information, Communications and Signal Processing, pp. 62-66, IEEE 2009.

Khan, I.R. et al., "HVS Based Histogram Adjustment for Tone Mapping", ACM Siggraph Asia 2009, Article No. 29.

Larson, G.W. et al., "A Visibility Matching Tone Reproduction Operator for High Dynamic Range Scenes", IEEE Transactions on Visualization and Computer Graphics, vol. 3, No. 4, Oct.-Dec. 1997, pp. 291-306.

Reinhard, E., "Parameter Estimation for Photographic Tone Reproduction", Journal of Graphics Tools, 7(1), pp. 45-51, Jan. 5, 2003.

Reinhard, E. et al., "Photographic Tone Reproduction for Digital Images", ACM Transactions on Graphics, Proceedings, Siggraph 2002, pp. 267-276, published in ACM Siggraph Journal, vol. 21, issue 3, Jul. 2002, pp. 267-276.

\* cited by examiner

LOCAL DEFINITION OF GLOBAL IMAGE TRANSFORMATIONS

CROSS-REFERENCE TO RELATED APPLICATIONS

This application is a continuation of U.S. patent application Ser. No. 13/442,766 filed on Apr. 9, 2012, which claims priority to U.S. Provisional Patent Application No. 61/473,691 filed on Apr. 8, 2011, which is incorporated herein by reference in its entirety.

TECHNICAL FIELD

The invention relates to imaging. In particular the invention relates to methods and apparatus for adjusting image characteristics such as tone or color.

BACKGROUND OF THE INVENTION

A digital image comprises an array of pixels. One or more values specify image characteristics for each pixel. Image characteristics may comprise, for example, luminance, chromaticity, luminance for individual color channels, and the like. Digital images may be represented in any of a wide array of formats. Non-limiting examples of image formats are RGB, XYZ, Luv, CIE LAB, and many others. One difference between different image formats is what image characteristics the pixel value(s) specified by the format represent.

Digital images may be adjusted for display by different devices and/or to provide a desired visual effect. Some non-limiting examples of image adjustments are increasing or decreasing dynamic range, increasing or decreasing contrast, increasing or decreasing average pixel values and the like.

A global adjustment comprises a mapping or transformation that may be applied to all pixels of an image. By contrast, a local adjustment applies different mappings or transformations to pixels within different local areas of an image. A global adjustment may be represented by a function that takes as input one or more pixel values for a pixel (the pixel values may comprise, for example values for the pixel in R- G- and B-channels) and provides as output one or more corresponding adjusted pixel values for the pixel.

It can be beneficial to adjust digital images for viewing on particular display apparatus. Display apparatus may employ any of a wide range of technologies. Some non-limiting examples are plasma displays, liquid crystal displays (LCDs), cathode ray tube (CRT) displays, organic light emitting diode (OLED) displays, projection displays that apply various light sources and various spatial light modulation technologies, and so on. Displays may be of a wide variety of types such as televisions, computer displays, displays in hand-held devices, displays used on control panels for equipment of different kinds, electronic game displays, digital cinema displays, special purpose displays such as virtual reality displays, advertising displays, stadium displays, medical imaging displays, and so on. Different displays may have different capabilities in areas such as: black level, maximum brightness, color gamut, and so on. A digital image may be optimized for viewing using a particular display apparatus by performing suitable image adjustments. As a simple example, an image in a high dynamic range (HDR) format may be adjusted for viewing on a display having a relatively low dynamic range.

Existing image-editing software such as, for example, Adobe™ Photoshop, Apple Aperture™ and others permit users to edit pixel values on a pixel-by pixel basis and to select and apply any of a wide range of transformations to pixel values. Professional editing suites and color grading stations also provide such capabilities. Such systems permit users to alter the appearance of images by setting parameters to define and applying any of a vast number of possible transformations. However, not all adjustments improve the appearance of images. Poorly chosen adjustments may obscure image details, introduce noticeable artifacts of various types, and/or alter the depictions of subjects in an image in non-natural ways. It takes significant skill to select transformations that will make any particular image have a desired visual effect. It can be time consuming for even a skilled image editor to use existing software tools to adjust a digital image to provide a desired visual effect.

There is a need for automatic or semi-automatic methods and apparatus for adjusting digital images for viewing.

SUMMARY OF THE INVENTION

This invention has a range of different aspects. Embodiments may provide displays, image processing systems that may be integrated with displays or other apparatus such as media players or stand-alone and methods for modifying image data for display. Other embodiments comprise tangible media carrying non-transitory computer-readable instructions which, when executed by a data processor cause the data processor to execute a method according to the invention.

One example aspect provides a method for adjusting image data defining an image. The method comprises generating a saliency map for the image and establishing a global transformation based on the image data. Establishing the global transformation comprises ignoring parts of the image data corresponding to image areas indicated by the saliency map as having low saliency or weighing parts of the image data corresponding to image areas indicated by the saliency map as having low saliency less heavily than other parts of the image data corresponding to image areas indicated by the saliency map as having higher saliency. The method applies the global transformation to the image data.

Generating the saliency map may be performed in different ways in different embodiments. In some embodiments generating the saliency map comprises applying a plurality of saliency algorithms to the image data and combining saliency maps produced by the plurality of saliency algorithms. In some embodiments combining the saliency maps produced by the plurality of saliency algorithms comprises computing a weighted sum or weighted average of the saliency maps produced by the plurality of saliency algorithms. For example, the plurality of saliency algorithms may include at least one saliency algorithm in which saliency is determined based on local contrast. As another example the plurality of saliency algorithms may include at least one saliency algorithm in which saliency is determined based on location in the image. As another example the plurality of saliency algorithms may include at least one saliency algorithm in which saliency is determined based on chromaticity of pixels in the image.

In some embodiments generating the saliency map comprises measuring local contrast of the image at each of a plurality of spatial frequency scales and computing a weighted combination of the local contrast of the image at each of the plurality of spatial frequency scales. In some embodiments, generating the saliency map comprises performing an object detection algorithm on the image to detect one or more objects in the image and setting areas in the saliency map corresponding to the detected objects to have increased saliency. The object detection algorithm may, for example, comprise a face detection algorithm.

Another example aspect of the invention provides a method for adjusting image data defining an image, The method comprises generating a saliency map for the image; generating a weighted histogram for the image by, for pixels in the image, adding values for the pixels from the saliency map to bin values for bins corresponding to pixel values for the pixels; and generating a global transformation based on the weighted histogram. In some embodiments the method comprises applying the global transformation to globally adjust the image data. In other embodiments the method comprises storing and/or transmitting a definition of the global transformation for use in adjusting the image data at a later time or in another location.

Further aspects of the invention and features of specific example embodiments of the invention are described below.

BRIEF DESCRIPTION OF THE DRAWINGS

The accompanying drawings illustrate non-limiting embodiments of the invention.

DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
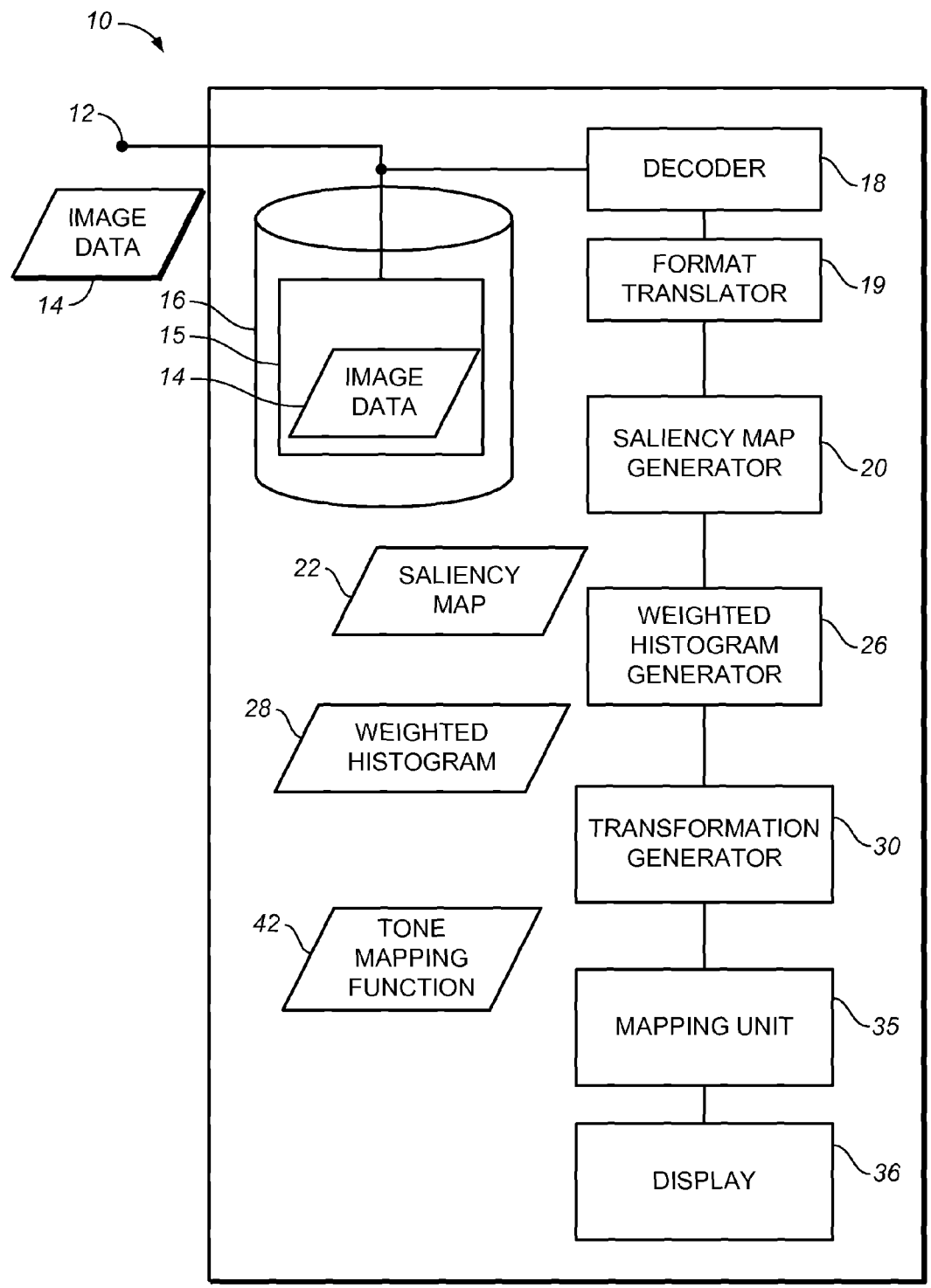
FIG. 1 is a block diagram of image adjustment apparatus according to an example embodiment.

FIG. 1 is a block diagram of image adjustment apparatus 10 according to an example embodiment. Apparatus 10 has an input 12 for receiving image data 14. Input 12 may be a physical input (e.g. an input configured to receive a wireless, optical, electrical or other signal encoding image data 14) or a logical input (e.g. an input configured to access a data structure 15 containing image data 14 in a data store 16).

Decoder block 18 decodes the image data 14, if necessary. Decoder 18 is not required in the case that image data 14 is not encoded. Format translator 19 translates image data 14 to a format used internally by image adjustment apparatus 10. Format translator 19 is not required in the case that image data 14 is already in the desired format. Format translator 19 may be configured, for example to transform image data 14 according to a transformation matrix.

Saliency map generator 20 generates a saliency map 22 indicative of the saliency of areas in the image of image data 14. Saliency map generator may process any of a number of inputs using one or more algorithms to generate saliency map 22. Saliency map 22 estimates the importance of pixels or regions of pixels in an image to a viewer. Inputs that may be processed in the creation of saliency map 22 include: image data 14; metadata that indicates the locations of objects and/or light sources in the image of image data 14; and information defining color values that are likely to correspond to areas of importance in the image (e.g. information defining color values corresponding to skin tones).

Saliency map generator 20 may apply algorithms to evaluate the relative importance of different areas of the image. Such algorithms may include, for example: algorithms that process the image data 14 to detect or detect and recognize objects depicted in the image of image data 14 (e.g. face-detection algorithms); algorithms that weight pixels based on the locations of the pixels in the image (e.g. pixels located closer to the center of an image may be weighted more heavily than pixels at the periphery of the image or pixels corresponding to objects located closer to the center of an image may be weighted more heavily than pixels corresponding to objects located near the periphery of the image which, in some embodiments may be weighted more heavily than pixels not corresponding to objects detected and/or recognized in the image); algorithms that weight pixels based on the chromaticity of the pixels (for example, pixels for which chromaticity is greater may be weighted more heavily than pixels for which chromaticity is lower); algorithms that weight pixels based on estimates of local contrast in the image and/or local spatial frequency content in the image (e.g. algorithms that compute scale-dependent local contrast and further weight each scale according to the sensitivity of the human visual system at that scale).

A range of algorithms that may be applied to create saliency maps for images is described in the technical literature. Saliency map generator 20 may generate saliency map 22 in whole or in part using such saliency mapping algorithms. By way of non-limiting example, saliency mapping algorithms based on or as described in the following papers and/or the references cited by those papers (all of which are hereby incorporated herein by reference) may be applied by saliency map generator 20: C. H. Lee et al. Saliency-Guided Lighting IEICE TRANS INF. & SYST. Vol. E92-D, No. 2, February 2009; p. 369-373. Obrador Content selection based on compositional image quality Media Technologies Laboratory, HP Laboratories Palo Alto, HPL-2006-166, Nov. 9, 2006; published at IS&T/SPIE 19th annual symposium on electronic imaging 28 Jan.-1 Feb. 2007 San Jose, Calif., USA; and, T. Yubing et al. Full Reference Image Quality Assessment Based on Saliency Map Analysis (accepted by International Journal of Imaging Science and Technology, 2010—available online at http://mrim.imag.fr/yubing.tong/Files_YubingTong/JIST4516-Accepted.pdf); C. H. Lee et al. Mesh Saliency SIGGRAPH '05 ACM SIGGRAPH 2005 Papers pp. 659-666.

In addition to or as an alternative to determining saliency by performing one or more saliency algorithms automatically, information regarding the saliency of various parts of an image may be entered by way of a user interface. For example, the user interface may allow a user to select a region of interest and to adjust a saliency of the region of interest. Selection may involve a user-input such as a mouse-click on a region of interest or lassoing a region of interest using a graphical user interface. In some embodiments, regions of possible interest are identified for possible selection by way of an object detection algorithm. A user may select regions or define and select regions and then increase or decrease saliency of selected regions. In another example embodiment saliency is initially estimated by way of one or more saliency algorithms and a user is optionally presented with an opportunity to modify the saliency as determined by the one or more algorithms using a suitable user interface as described above.

Determining saliency based on user input may be particularly useful in cases where methods as described herein are performed by or in conjunction with a semi-automatic color-grading system.

In some embodiments, saliency map 22 comprises a value corresponding to each pixel in image data 14.

Saliency may be measured by a continuous measure or a measure having a number of discrete values. In some embodiments, saliency may be measured according to a binary scale in which regions of interest (higher-saliency regions) have a first, higher, saliency value and other regions of the image have a second, lower, saliency value. In some embodiments, the lower saliency value is zero. The first and second saliency values may be 1 and 0, for example. In such embodiments, computing the weighted histogram may comprise computing a histogram for higher-saliency regions only (neglecting pixels outside of such selected regions in generating the histogram). A normalization step may be performed on the resulting histogram.

Weighted histogram generator 26 generates a weighted histogram 28 for the image of image data 14. Weighted histogram 28 comprises a plurality of bin values. In a conventional image histogram, each bin value indicates the number of pixels in the image having pixel values falling into a range corresponding to the bin value. The range may include one or more possible pixel values. A conventional histogram may be generated, for example, by simply counting the number of pixels having pixel values in each of a plurality of ranges.

Weighted histogram generator 26 generates a weighted histogram 28 based on image data 14 and saliency map 22. In an example embodiment, weighted histogram generator 26 operates by determining from its pixel value which bin a pixel corresponds to and incrementing the bin value for that bin by the corresponding weight from saliency map 22. Weighted histogram 28 is preferably normalized.

In some embodiments in making weighted histogram 28, some pixels are given zero weights. For example, saliency values of 0 may be assigned to low-saliency pixels in saliency map 22. As another example, pixels having saliency below some threshold (e.g. the lowest 20% or 30% or a saliency below a saliency threshold which may optionally be user selectable by way of a suitable user interface) may be given a weight of 0 (or, equivalently, ignored in computing the weighted histogram). In some embodiments, weighted histogram generator 26 generates weighted histogram 28 based exclusively on the values of pixels in high-saliency areas in which the saliency exceeds a threshold level.

Figure 2:
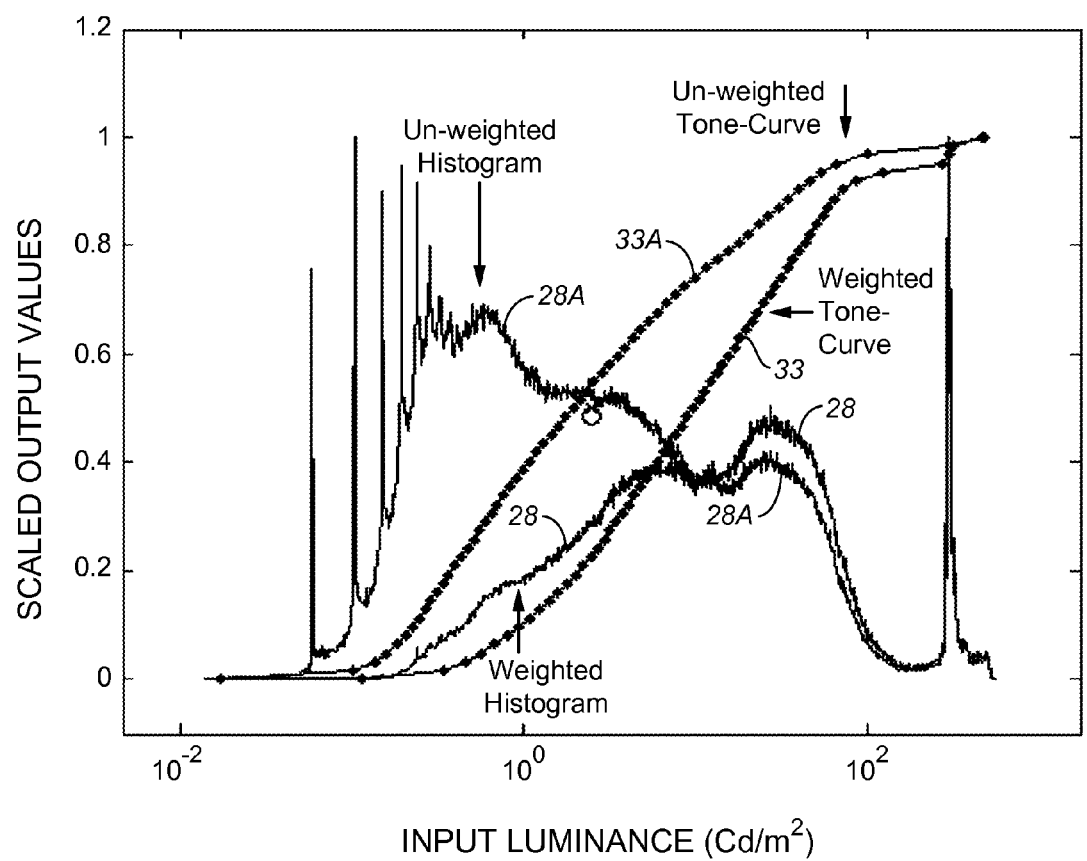
FIG. 2 is a graph showing example conventional and weighted tone histograms and corresponding tone mapping curves.

FIG. 2 is a graphical depiction showing an example of a conventional histogram 28A for an image. Histogram 28A comprises a curve that indicates the number of pixels in the image having pixel values falling within each of N bins.

FIG. 2 also shows a weighted histogram 28 for the same image. It can be seen that some bins in weighted histogram 28 have greater values than corresponding bind in conventional histogram 28A and vice versa.

Transformation generator 30 generates a transformation based on weighted histogram 28. Consider the case where weighted histogram 28 is based on pixel luminance (tone) values. Transformation generator 30 may generate a tone mapping function 32 which maps pixel luminance values from image data 14 to corresponding altered luminance values. Algorithms for generating tone mapping functions (e.g. tone curves) based on image histograms are known. For example: Reinhard's photographic tone-mapping operator, the histogram-adjustment tone-mapping operator, and others use information present in image histograms to establish tone mappings. Such algorithms may generate tone mapping curves based on weighted histogram 28.

FIG. 2 shows tone mapping curves 33 and 33A which correspond respectively to weighted histogram 28 and conventional histogram 28A.

Mapping unit 35 maps image data 14 to altered image data 14A using the transformation determined by transformation generator 30. A display 36 displays altered image data 14A.

Figure 3:
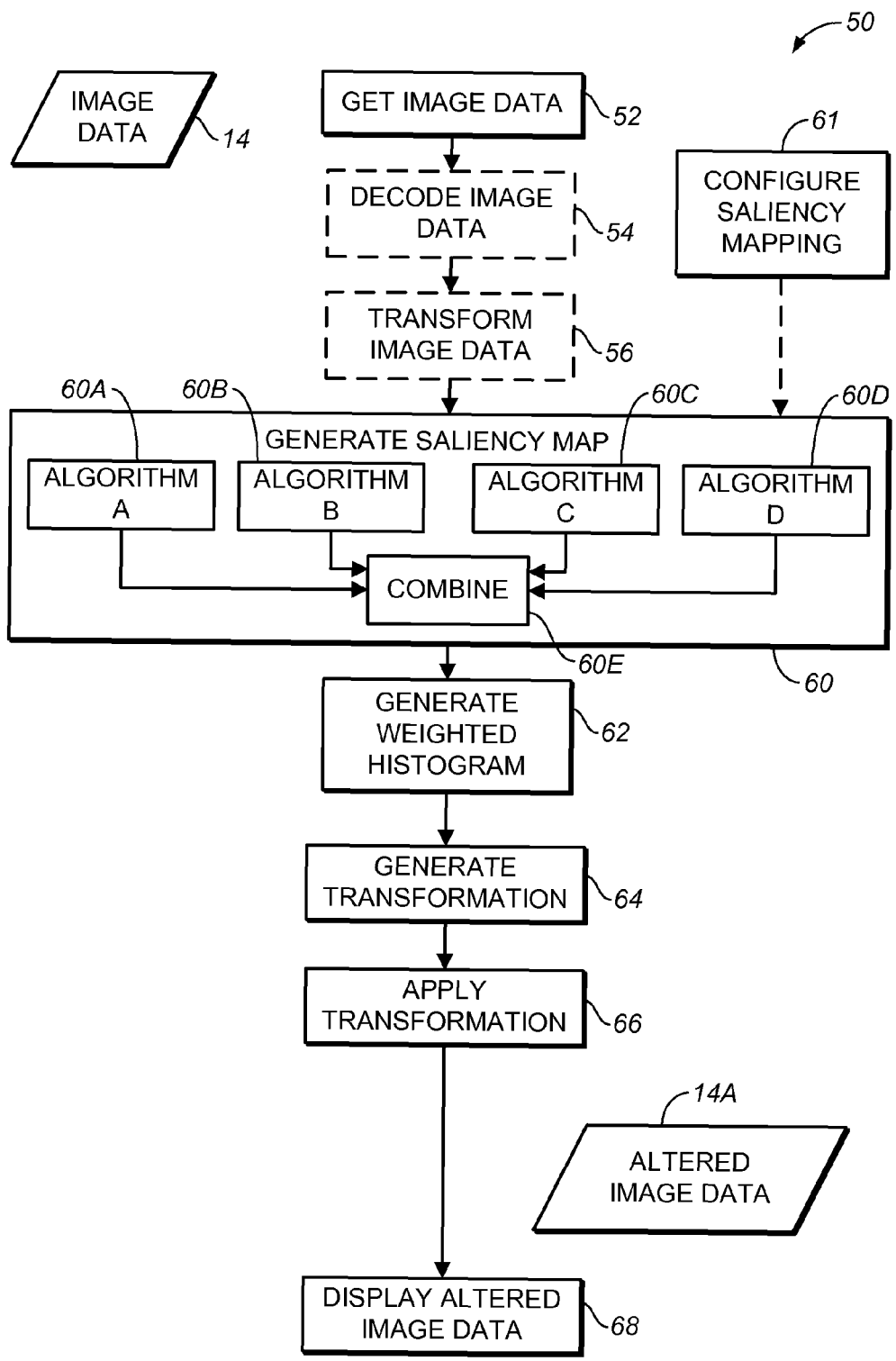
FIG. 3 is a flow chart illustrating an image adjustment method according to an example embodiment.

FIG. 3 illustrates a method 50 according to another example embodiment. Block 52 acquires image data 14 to be altered. Optional block 54 decodes the image data 14. Optional block 56 transforms the image data 14 to a desired format. In an example embodiment, method 50 operates on image data 14 that is represented in the L*a*b* color space and block 56 transforms the image data into that color space (if it is not already).

Block 60 generates a saliency map for the image of image data 14. In some embodiments, block 60 applies a plurality of different saliency algorithms and combines the results of those algorithms. In the illustrated embodiment, block 60 comprises blocks 60A, 60B, 60C and 60D which each apply a saliency algorithm to generate a saliency map. The saliency maps are combined in block 60E.

In some embodiments, different saliency algorithms are weighted differently in the combination of block 60E.

In an example embodiment, block 60A applies a saliency algorithm based on the proximity of a pixel to the center of the image. It is typical that more important content tends to be located near the center of an image. Block 60A may, for example, generate a saliency-map based on a Gaussian that is a little wider than it is tall (to account for the typically longer display direction being the horizontal direction).

Block 60B may generate a saliency map based on the amount of chroma in a pixel. For example in the L*a*b* color-space chroma-saliency may be given by $$\sqrt{(a^*)^2+(b^*)^2}.$$

Block 60C may generate a saliency map based on a local-contrast estimate. In an example embodiment the local contrast estimate is based on the sensitivity of the human visual system (HVS) to local contrast. For example, local contrast at a number of spatial frequencies may be estimated by applying the well-known Gaussian image-pyramid approximation to scale-dependent local contrast. The estimated local contrast at each scale may then be weighted according to how sensitive the human visual system is to local contrast at that particular scale.

Block 60D may generate a saliency map based on metadata that indicates important regions within the image. Block 60D may generate a saliency map that weights pixels in such areas more heavily than other pixels. In the absence of any areas indicated as being important be metadata, block 60D may generate a saliency map in which all pixels are weighted equally.

Block 60E may combine saliency maps from blocks 60A to 60D by summation or averaging, for example. In some embodiments block 60E comprises computing a weighted sum or weighted average of the saliency maps from blocks 60A to 60D. The weights may be chosen so that saliency maps considered to be most important are weighted more heavily than other saliency maps.

In some embodiments, method 50 includes a configuration step 61 in which metadata directly or indirectly specifying saliency algorithms to be applied to image data 14 is received. Different ones of blocks 60A, 60B, 60C and 60D (or other blocks not shown which perform saliency mapping according to other algorithms) may be enabled or disabled according to the metadata.

Block 62 generates a weighted histogram based on image data 14 and the saliency map from block 60. Block 64 generates a transformation from the weighted histogram of block 62. Block 64 may, for example, apply a histogram adjustment tone mapping algorithm. Examples of such algorithms are described in: Ward et al. A visibility matching tone reproduction operator for high dynamic range scenes, IEEE Transactions on Visualization and Computer Graphics 3, 4, 291-306, 1997; Khan et al., HVS based histogram adjustment for tone mapping ACM SIGGRAPH ASIA 2009; Khan et al. HDR image tone mapping using histogram adjustment adapted to human visual system ICICS' 09 Proceedings of the 7th international conference on Information, communications and signal processing pp. 62-66 IEEE 2009 (ISBN: 978-1-4244-4656-8); Duan et al. Tone-mapping high dynamic range images by novel histogram adjustment, Pattern Recognition Vol. 43, No. 5, May 2010, pp. 1847-1862; U.S. Pat. No. 7,639,893 Histogram adjustment for high dynamic range image mapping; all of which are hereby incorporated herein by reference.

As another example, block 64 may generate a transformation according to Reinhard's photographic tone-mapping operator (see Reinhard et al., Photographic Tone Reproduction for Digital Images, ACM Transactions on Graphics, Proceedings Siggraph 2002; and Reinhard Parameter Estimation for Photographic Tone Reproduction Journal of Graphics Tools, 7(1), pp 45-51, January 2003 which are hereby incorporated herein by reference). Reinhard's algorithms use the geometric mean of the source luminance map to anchor the brightness in the image. Block 64 may apply a variation of Reinhard's algorithms in which a geometric mean is calculated based on weighted histogram 62. The resulting transformation will have a luminance anchoring value that better represents the most salient regions in the source image.

It is not mandatory that the transformation of block 64 expands or reduces the overall dynamic range of an image (although it may have one of these effects). In some embodiments the transformation may reallocate pixel values within the dynamic range of the image. For example, if a region of interest (ROI) takes up a certain part of the dynamic range (DR) of the image, block 64 may be configured to generate a transformation that expands the portion of the dynamic range of the image taken up by the majority of pixels within that ROI while leaving the overall dynamic range of the image unaltered.

Block 66 applies the transformation of block 64 to image data 14 to generate altered image data 14A.

Block 68 generates a display using the altered image data 14A.

In some embodiments the methods and apparatus described herein are applied to adjustment of video image data. Global transformations generated as described herein may be applied in real time or in a non-real-time pre-processing step. It is not mandatory to compute a fresh global transformation for every frame. In some embodiments, a global transformation is computed once every few frames, once for each scene, some combination thereof or the like.

In some embodiments, saliency mapping is performed at a video source and saliency maps are transmitted as metadata associated with video data. In some embodiments, the saliency maps are downsampled prior to transmission to reduce their size.

Advantageously, the transformation applied by block 66 is a global transformation. This facilitates efficient computation of the transformation. Further, while not mandatory, the transformation of block 66 may be performed separately for each pixel of image data 14. Thus, the time required to perform the transformation may be reduced by parallel application of the transformation to multiple pixels.

Another advantage of certain embodiments is that while features are found spatially and locally by saliency, mapping, the transformation used to generate altered image data is applied globally thus avoiding artifacts of the type typically associated with local operations. Non-limiting examples of artifacts that can arise as a result of local manipulation of images include haloing, ringing and contrast reversal.

Apparatus, systems, modules and components described herein (including without limitation decoders, translators, generators, mapping units, and the like) may comprise software, firmware, hardware, or any combination(s) of software, firmware, or hardware suitable for the purposes described herein. Such software, firmware, hardware and combinations thereof may reside on personal computers, set top boxes, media players, video projectors, servers, displays (such as televisions, computer monitors, and the like) and other devices suitable for the purposes described herein. Furthermore, aspects of the system can be embodied in a special purpose computer or data processor that is specifically programmed, configured, or constructed to perform one or more of the computer-executable instructions explained in detail herein.

Image processing and processing steps (including without limitation steps directed to image analysis) as described above may be performed in hardware, software or suitable combinations of hardware and software. For example, such image processing may be performed by a data processor (such as one or more microprocessors, graphics processors, digital signal processors or the like) executing software and/or firmware instructions which cause the data processor to implement methods as described herein. Such methods may also be performed by logic circuits which may be hard configured or configurable (such as, for example logic circuits provided by a field-programmable gate array "FPGA"). Image processing and processing steps as described above may operate on and/or produce image data (including without limitation saliency maps, histograms, mapping functions and the like) embodied in computer-readable signals carried on non-transitory media.

Certain implementations of the invention comprise computer processors which execute software instructions which cause the processors to perform a method of the invention. For example, one or more processors in a display, personal computer, set top box, media player, video projector, server, or the like may implement methods as described herein by executing software instructions in a program memory accessible to the processors.

Some aspects of the invention may also be provided in the form of a program product. The program product may comprise any non-transitory medium which carries a set of computer-readable signals comprising instructions which, when executed by a data processor, cause the data processor to execute a method of the invention. For example, such a program product may comprise instructions which cause a data processor in a display to adjust the image data for display on the display. Program products according to the invention may be in any of a wide variety of forms. The program product may comprise, for example, media such as magnetic data storage media including floppy diskettes, hard disk drives, optical data storage media including CD ROMs, DVDs, electronic data storage media including ROMs, flash RAM, hardwired or preprogrammed chips (e.g., EEPROM semiconductor chips), nanotechnology memory, or the like. The computer-readable signals on the program product may optionally be compressed or encrypted. Computer instructions, data structures, and other data used in the practice of the technology may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

The teachings of the technology provided herein can be applied to other systems, not necessarily the system described above. The elements and acts of the various examples described above can be combined to provide further examples. Aspects of the system can be modified, if necessary, to employ the systems, functions, and concepts of the various references described above to provide yet further examples of the technology.

Where a component (e.g. a software module, processor, assembly, device, circuit, decoder, translator, generator, mapping unit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

These and other changes can be made to the system in light of the above Description. While the above description describes certain examples of the system, and describes the best mode contemplated, no matter how detailed the above appears in text, the system can be practiced in many ways. Details of the system and method for classifying and transferring information may vary considerably in its implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Description section explicitly and restrictively defines such terms. Accordingly, the actual scope of the system encompasses not only the disclosed examples, but also all equivalent ways of practicing or implementing the technology under the claims.

From the foregoing, it will be appreciated that specific examples of systems and methods have been described herein for purposes of illustration, but that various modifications, alterations, additions and permutations may be made without deviating from the spirit and scope of the invention. The embodiments described herein are only examples. Those skilled in the art will appreciate that certain features of embodiments described herein may be used in combination with features of other embodiments described herein, and that embodiments described herein may be practiced or implemented without all of the features ascribed to them herein. Such variations on described embodiments that would be apparent to the skilled addressee, including variations comprising mixing and matching of features from different embodiments, are within the scope of this invention.

As will be apparent to those skilled in the art in the light of the foregoing disclosure, many alterations and modifications are possible in the practice of this invention without departing from the spirit or scope thereof. For example: A global transformation may be generated based on statistical, spatial or scale-dependent features of a source image other than a luminance histogram. Such features may be determined in a way that results in the pixel values that go into the computation of the features being weighted according to the saliency of the pixels (or the saliency of the region to which the pixels belong). For example, features of an image that may be computed include the power spectrum or Fourier transform of the luminance or chroma-channels of the image; histograms of chroma channels of the image; the "base-layer" or the "details-layer" as obtained from the bilaterally filtered input image, etc. Saliency-weighted versions of any of these features may be determined. Global transformations may then be determined based on the saliency-weighted features and applied to the image.

Accordingly, the scope of the invention is to be construed in accordance with the substance defined by the following claims.

What is claimed is:

1. A method for adjusting image data defining an image, the method comprising, by a data processor executing software and/or firmware instructions:
   generating a saliency map for the image wherein generating the saliency map comprises one or more of:
      assigning saliency to pixels based on the locations of the pixels in the image; and
      receiving information regarding the saliency of various parts of the image by way of a user interface;
   establishing a global transformation based on the image data wherein establishing the global transformation comprises:
      ignoring parts of the image data corresponding to image areas indicated by the saliency map as having low saliency; or
      weighing parts of the image data corresponding to image areas indicated by the saliency map as having low saliency less heavily than other parts of the image data corresponding to image areas indicated by the saliency map as having higher saliency;
   and one or more of:
      applying the global transformation to the image data to yield altered image data and displaying the altered image data on a display;
      applying the global transformation to the image data to yield altered image data and storing the altered image data on a non-transitory medium; and
      storing a definition of the global transformation on a non-transitory medium.

2. A method according to claim 1 wherein generating the saliency map comprises identifying objects in the image and setting saliency of the pixels associated with the objects based on locations of the pixels in the image.

3. A method according to claim 2 wherein generating the saliency map is based at least in part on metadata that indicates the locations of objects and/or light sources in the image.

4. A method according to claim 2 wherein generating the saliency map comprises weighting pixels corresponding to those of the objects located closer to a center of an image more heavily than pixels corresponding to those of the objects located near a periphery of the image and weighting pixels corresponding to those of the objects located near a periphery of the image more heavily than pixels not associated with any of the objects.

5. A method according to claim 1 wherein generating the saliency map comprises weighting pixels located closer to a center of an image more heavily than pixels at a periphery of the image.

6. A method for adjusting image data defining an image, the method comprising, by a data processor executing software and/or firmware instructions:
generating a saliency map for the image wherein generating the saliency map comprises one or more of:
assigning saliency to pixels based on the locations of the pixels in the image; and
receiving information regarding the saliency of various parts of the image by way of a user interface;
establishing a global transformation based on the image data wherein establishing the global transformation comprises:
ignoring parts of the image data corresponding to image areas indicated by the saliency map as having low saliency; or
weighing parts of the image data corresponding to image areas indicated by the saliency map as having low saliency less heavily than other parts of the image data corresponding to image areas indicated by the saliency map as having higher saliency;
and one or more of:
applying the global transformation to the image data to yield altered image data and displaying the altered image data on a display;
applying the global transformation to the image data to yield altered image data and storing the altered image data on a non-transitory medium; and
storing a definition of the global transformation on a non-transitory medium
wherein generating the saliency map comprises receiving a user selection of a region of interest by way of the user interface.

7. A method according to claim 6 comprising receiving user input regarding a saliency of the region of interest by way of the user interface.

8. A method according to claim 7 comprising receiving commands to increase or decrease saliency of the selected region of interest by way of the user interface.

9. A method according to claim 6 comprising determining saliency for pixels in the region of interest according to one or more saliency algorithms and receiving commands to increase or decrease saliency of the selected region of interest by way of the user interface.

10. A method according to claim 6 comprising applying an object detection algorithm to the image data and identifying one or more regions of interest for possible selection by a user based on an output of the object detection algorithm.

11. A method according to claim 1 wherein generating the saliency map comprises performing an object detection algorithm on the image to detect one or more objects in the image and setting areas in the saliency map corresponding to the detected objects to have increased saliency.

12. A method according to claim 1 wherein generating the saliency map comprises applying a plurality of saliency algorithms to the image data and combining saliency maps produced by the plurality of saliency algorithms.

13. A method according to claim 12 wherein combining the saliency maps produced by the plurality of saliency algorithms comprises computing a weighted sum or weighted average of the saliency maps produced by the plurality of saliency algorithms.

14. A method according to claim 12 wherein the plurality of saliency algorithms includes at least one saliency algorithm in which saliency is determined based on local contrast.

15. A method for adjusting image data defining an image, the method comprising, by a data processor executing software and/or firmware instructions:
generating a saliency map for the image wherein generating the saliency map comprises one or more of:
assigning saliency to pixels based on the locations of the pixels in the image; and
receiving information regarding the saliency of various parts of the image by way of a user interface;
establishing a global transformation based on the image data wherein establishing the global transformation comprises:
ignoring parts of the image data corresponding to image areas indicated by the saliency map as having low saliency; or
weighing parts of the image data corresponding to image areas indicated by the saliency map as having low saliency less heavily than other parts of the image data corresponding to image areas indicated by the saliency map as having higher saliency;
and one or more of:
applying the global transformation to the image data to yield altered image data and displaying the altered image data on a display;
applying the global transformation to the image data to yield altered image data and storing the altered image data on a non-transitory medium; and
storing a definition of the global transformation on a non-transitory medium
wherein generating the saliency map comprises applying a plurality of saliency algorithms to the image data and combining saliency maps produced by the plurality of saliency algorithms
wherein the plurality of saliency algorithms includes at least one saliency algorithm in which saliency is determined based on local contrast
wherein in the saliency algorithm in which saliency is determined based on local contrast, the local contrast of the image at each of a plurality of spatial frequency scales is weighted according to a relative sensitivity of the human visual system to contrast at the spatial frequency scale.

16. A method according to claim 15 wherein computing the local contrast at the plurality of spatial frequency scales comprises computing a Gaussian image-pyramid approximation to local contrast.

17. A method according to claim 1 wherein generating the saliency map comprises generating a map in which saliency is a function of distance from a central area or pixel of the image.

18. A method according to claim 17 wherein the function of the distance from the central area or pixel is a Gaussian function.

19. A method according to claim 1 wherein generating the saliency map comprises obtaining metadata specifying one or more special areas within the image and setting the special areas to have increased saliency in the saliency map.

20. A method according claim 1 wherein establishing the global transformation comprises computing a weighted histogram of the image data.

21. A method according to claim 20 wherein establishing the global transformation comprises generating a tone mapping function based on the weighted histogram.

22. A method according to claim 20 wherein pixels having saliency values below a saliency threshold are the ignored in computing the weighted histogram.

23. A method for adjusting image data defining an image, the method comprising, by a data processor executing software and/or firmware instructions:
generating a saliency map for the image wherein generating the saliency map comprises one or more of:
assigning saliency to pixels based on the locations of the pixels in the image; and
receiving information regarding the saliency of various parts of the image by way of a user interface;
establishing a global transformation based on the image data wherein establishing the global transformation comprises:
ignoring parts of the image data corresponding to image areas indicated by the saliency map as having low saliency; or
weighing parts of the image data corresponding to image areas indicated by the saliency map as having low saliency less heavily than other parts of the image data corresponding to image areas indicated by the saliency map as having higher saliency;
and one or more of:
applying the global transformation to the image data to yield altered image data and displaying the altered image data on a display;
applying the global transformation to the image data to yield altered image data and storing the altered image data on a non-transitory medium; and
storing a definition of the global transformation on a non-transitory medium
wherein establishing the global transformation comprises computing a weighted histogram of the image data
wherein pixels having saliency values below a saliency threshold are the ignored in computing the weighted histogram
the method comprising setting a value for the saliency threshold based on an input received by way of the user interface.

24. A method according to claim 1 wherein the image data comprises video data, and the method comprises generating the saliency map at a video source and transmitting the saliency map as metadata associated with the video data.

* * * * *